Patented Nov. 21, 1950

2,531,196

UNITED STATES PATENT OFFICE 2,531,196

VINYL POLYMERS AND PROCESS FOR PRODUCING THE SAME

Merlin M. Brubaker, Boothwyn, and Ralph A. Jacobson, Landenburg, Pa., assignors to E. I. du Pont de Nemours & Company, Wilmington, Del., a corporation of Delaware No Drawing. Application October 20, 1942, Serial No. 462,752

9 Claims. (Cl. 260—85.5)

This invention relates to vinyl polymers and to a process for their production. More particularly, it relates to conjoint polymers of isobutylene with vinyl compounds and to a process for their production.

Although isobutylene itself can be polymerized to high molecular weight rubber-like polymers by using an inorganic halide type catalyst and operating at low temperatures, attempts to apply the same technique to copoylymerization of isobutylene with vinyl compounds have been less satisfactory because of complicating side reactions. Moreover, the process is neither economical nor efficient for large scale operations, and satisfactory products can be isolated only with great difficulty.

This invention has as its object the providing of a process for the copolymerization of isobutylene with vinyl compounds. Another object is to provide a process for the copolymerization of isobutylene with vinyl compounds that is economical and efficient in large scale operation. Still another object is to provide a process for the copolymerization of isobutylene with vinyl compounds whereby products are obtained that are easily isolated. Another object is to provide certain new and improved conjoint polymers of isobutylene and vinyl compounds. Other objects will be apparent from the following description of the invention.

These objects are accomplished by the following invention which comprises polymerizing the polymerizable components of an aqueous emulsion of isobutylene and at least one other readily polymerizable compound having a single ethylenic double bond attached to a terminal methylene group, said aqueous medium of which contains a dissolved salt of perdisulfuric acid and a dispersing agent comprising an alkali metal salt of a long chain alkyl sulfate or sulfonate, wherein the alkyl group contains from 12–18 carbon atoms. It is considered preferable to carry out this reaction in a closed vessel containing a substantially oxygen-free gas in contact with said emulsion.

In general, the customary mode of practicing the invention is as follows: An aqueous medium containing about 0.1 to 2% of a perdisulfate salt and about 1 to 5% of a dispersing agent as defined above is placed in a suitable pressure vessel which is provided with a means of agitation such as stirring or shaking. The solution is then cooled below the boiling point of monomeric isobutylene and the mixture of isobutylene and vinyl compound to be polymerized added in such proportions that the ratio of the aqueous to the non-aqueous phase lies within the range of 2:1 and 3:1. Atmospheric oxygen is removed from the vessel by flushing with nitrogen and the vessel is then sealed. The mixture is then agitated vigorously to produce emulsification. It is thereafter heated at a constant temperature in the range of about 20° C. to about 80° C. with constant or intermittent agitation until the polymerization has proceeded to the desired extent.

The following examples, in which parts are given by weight, more fully illustrate the invention.

*Example 1.—Acrylonitrile/isobutylene copolymer*

A solution of 7.8 parts of a commercial dispersing agent, containing about 22% of active ingredient consisting mainly of sodium cetyl sulfate, in 111 parts of water is prepared by warming on the steam bath and charged into a vessel capable of withstanding moderate pressures. The solution is cooled below the boiling point of isobutylene and 0.612 part of ammonium perdisulfate, 0.15 part of sodium bicarbonate, 30 parts of acrylonitrile, and 30 parts of isobutylene added in the order named. The air in the reaction vessel is flushed out with nitrogen and the vessel closed. After the contents of the vessel have been liquefied by warming slightly, the vessel is agitated at 25° C. for a period of 137 hours. The unreacted isobutylene is then purged from the dispersion and steam passed into the mixture to volatilize any residual acrylonitrile monomer. The polymerization mixture is then cooled to 50° C. and 20 parts of 10% aluminum sulfate added with stirring to coagulate the dispersion. The product which separates is filtered, thoroughly washed with water and dried. The yield amounts to 39 parts of copolymer containing about 29.5% isobutylene by weight, based on nitrogen content. Specimens of the copolymer molded at 156° C. and 2000 lbs./sq. in. pressure are amber in color, clear and tough. A molded bar has a softening point of about 76° C. The product is soluble in methyl ethyl ketone, acetone, and cyclohexanone.

*Example 2.—Methyl methacrylate/isobutylene copolymer*

A mixture of 48 parts of isobutylene and 12 parts of methyl methacrylate is polymerized as in Example 1, except that the polymerization is carried out at 45° C. for a total of 160 hours. There is thus obtained 14.5 parts of polymer containing about 15% isobutylene by weight, based on analytical data. The copolymer can be readily molded at 150° C. and 2000 lbs./sq. in. pressure and yields clear, colorless, brittle bars which soften at about 74° C. The copolymer is soluble in butyl acetate, methyl ethyl ketone, dioxan, toluene and cyclohexanone.

As the ratio of isobutylene to methyl methacrylate in the polymerization mixture is increased, the isobutylene content in the copolymer is also increased but the yield of polymer based on total monomers is substantially decreased. The softening point is similarly lowered with increase in isobutylene content.

*Example 3.—Vinyl acetate/isobutylene copolymer*

A solution of 24 parts of a commercial dispersing agent containing about 32% active ingredient, which consists mainly of the sodium salt of sulfonated paraffin white oil (essentially identical to that described in Example III of U. S. Patent 2,197,800), in 222 parts of water is prepared by warming on the steam bath and charged into a suitable pressure vessel. The solution is cooled below the boiling point of isobutylene and 1.2 parts of ammonium perdisulfate, 1 part of sodium bicarbonate, 102 parts of vinyl acetate and 18 parts of isobutylene added in the order named. The polymerization and isolation of the copolymer is then carried out as described in the preceding examples. After a total of 112 hours at 45° C., there is obtained 105 parts of polymer. The product, which contains about 5 to 10% isobutylene based on analytical data, may be molded to clear, colorless and flexible articles.

*Example 4.—Vinyl chloride/isobutylene copolymer*

A dispersing solution is prepared as described in Example 1, 0.6 part potassium perdisulfate added, and the pH of the solution then adjusted to 10.3 by the addition of 10% sodium hydroxide. This solution is placed in a suitable reaction vessel, cooled below the boiling point of vinyl chloride and a mixture of 48 parts of vinyl chloride and 12 parts of isobutylene added. Polymerization is carried out as described in the above examples at 45° C. for a period of 94 hours. The copolymer is isolated as in Example 1 and amounts to 44.5 parts. Chlorine analysis indicates the copolymer to contain 13% isobutylene by weight. The product can be molded at 100° C. and 1000 lbs./sq. in. pressure to give clear, brittle articles.

*Example 5.—Asymmetrical dichloroethylene/isobutylene copolymer*

A mixture of 96 parts of asymmetrical dichloroethylene and 24 parts of isobutylene is polymerized as in Example 3, except that the polymerization is carried out at 45° C. for a total of 192 hours. There is obtained 108 parts of polymer containing about 14% isobutylene by weight based on chlorine analysis.

When equal amounts of isobutylene and asymmetrical dichloroethylene are used, a soft, cheesy copolymer is obtained. It is soluble in methyl ethyl ketone, dioxan, xylene, cyclohexanone, and ethylene dichloride.

*Example 6.—Methyl chloracrylate/isobutylene copolymer*

A mixture of 30 parts of methyl chloracrylate and 30 parts of isobutylene is polymerized as in Example 1, except the polymerization is carried out at 45° C. for 186 hours. The yield of copolymer amounts to 32.8 parts and chlorine analysis indicates the copolymer contains about 13% isobutylene by weight. Specimens of the polymer molded at 165° C. and 2000 lbs./sq. in. pressure are clear, brittle articles which soften about 112° C. The copolymer is soluble in dioxan, cyclohexanone and ethylene dichloride.

*Example 7.—Styrene/isobutylene copolymer*

A mixture of 48 parts of styrene and 12 parts of isobutylene is polymerized as described in the preceding example and yields 47.6 parts of copolymer. Specimens of the copolymer molded at 150° C. and 2000 lbs./sq. in. pressure are clear, brittle articles which soften around 88° C.

As indicated heretofore this invention is directed to the preparation of conjoint polymers of isobutylene with at least one other polymerizable compound having a single ethylenic double bond attached to a terminal methylene group. The vinyl and vinylidene compounds which may be used include vinyl halides such as vinyl chloride, vinyl fluoride, and vinyl bromide; methyl methacrylate, ethyl methacrylate, butyl methacrylate, octyl methacrylate, 2-nitro-2-methyl propyl methacrylate, methoxyethyl methacrylate, phenyl methacrylate, cyclohexyl methacrylate, and the corresponding esters of acrylic acid; acrylonitrile and methacrylonitrile; acryl- and methacrylamide or mono-alkyl substitution products thereof; unsaturated ketones such as methyl vinyl ketone, phenyl vinyl ketone, and methyl isopropenyl ketone; vinyl carboxylates such as vinyl acetate, vinyl chloroacetate, vinyl propionate, vinyl stearate, vinyl phenyl acetate, and vinyl benzoate; derivatives of alpha-chloracrylic acid as methyl chloracrylate; asymmetrical dichloroethylene; and styrene. It is also within the scope of this invention to copolymerize isobutylene with two or more of the above-named substances.

The proportions of isobutylene in the unpolymerized mixture may vary from 1% to 99%, preferably from 5–50% of the total weight of the polymerizable components.

The copolymers obtained contain a considerably lower percentage of isobutylene than was present in the monomer mixtures. This is amply illustrated in the examples.

The polymerization catalysts encompassed by this invention include the water-soluble salts of perdisulfuric acid. In addition to the ammonium salt disclosed in the examples, there may also be used the sodium, potassium, lithium, barium and calcium perdisulfates. It is known that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suited for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product and rapidity of polymerization, the preferred proportion of perdisulfate salts lies in the range of 0.1% to 4% based on weight of monomer.

In addition to the dispersing agents disclosed in the foregoing examples, there may be mentioned the alkali metal salts of the following long chain alkyl sulfates and sulfonate: dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants, and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are useful only when an operable dispersant is also present, may include inorganic salts, long chain primary alcohols, carbohydrate derivatives, polyvinyl alcohol, etc.

Using the rate of polymerization as a criterion, the invention encompasses the use of dispersing agent active ingredients in concentrations of 0.2 to 5% based on the weight of the aqueous medium used in the copolymerization of isobutylene with other polymerizable compounds. Within this range the preferred concentration will in general depend upon the proportion of monomer present, but is usually from 0.5 to 4%. From the standpoint of economy and to facilitate removing the dispersing agent from the polymerized product, it is customary to use the least amount of dispersing agent necessary to bring about the desired rate of polymerization. It is to be understood that when reference is made to the use of definite percentages of dispersing agents, these values are calculated on the basis of the known active ingredient concentration, in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbomixers. The dispersing agents of this invention are in general useful in forming stable emulsions, which after they are once formed, require little or no agitation thereafter. It has been found, however, that polymerization occurs more rapidly in certain emulsions while they are being agitated. It is, accordingly, preferred to assist the dispersing agent in producing and maintaining the emulsion by mechanical means. It should be emphasized that the dependence of the efficiency of the dispersing agents upon the active ingredient concentration and agitation in no way repudiates the sharp distinction previously noted between the dispersing agents of this invention and those which are not comprehended within this class of compounds. Thus, with most of the usual dispersing agents it is impossible to obtain the rapid rate characteristic of the agents used in this invention, either by most vigorous agitation or by the use of concentrations as high as the solubility of the material will permit. Even in instances where such modifications of systems involving the usual dispersing agents permit sufficient acceleration of the polymerization rate, the process is not practicable because of the expense and operating difficulties entailed by the use of very high proportions of dispersing agent.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred that the aqueous/non-aqueous ratio shall be approximately 4:1 to 1:1 since for a given reaction vessel the time-space yield is greatly reduced by the use of higher ratios. It is also helpful in maintaining an emulsion if the proportion by weight of non-aqueous to aqueous phase is not greater than 1:1.

As is well known, the dependence of the rate of vinyl polymerization upon the temperature is very important, and low temperatures cannot be generally used because the corresponding rate of reaction is impracticably low. The present invention can be operated at temperatures above the freezing point of the aqueous phase which is somewhat below 0° C. up to about 100° C., above which the product may be adversely affected by the aqueous medium. It is preferred to employ temperatures in the range of 20° C. to 70° C.

It is realized that the presence of oxygen in the polymerization vessel, while not appearing to have a deleterious effect on the properties of the polymers of this invention, may adversely affect the rate of polymerization in certain cases. In these cases it is, therefore, preferable to displace the air from the polymerization vessel by means of a gas which does not retard the rate of polymerization. Suitable gases are nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization.

The process is not limited to any particular apparatus but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver or lead. Vessels equipped with glass or enamel liners may also be used.

In the examples, all of the vinyl compound is added initially to the aqueous dispersion prior to polymerization. It is within the scope of the present invention to add the vinyl or vinylidene compound portionwise to the dispersion during the polymerization, or to add the isobutylene to the partially polymerized vinyl compound and then to continue the polymerization. The conditions selected for copolymerizing isobutylene with a given vinyl or vinylidene compound will depend upon the ease with which the latter compound polymerizes and upon the type of product desired.

At the conclusion of polymerization the products of this invention may be isolated as by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol. The polymers are conveniently dried in ovens at moderate temperatures or in open trays under a gentle stream of warm dust-free air.

The products prepared according to the present invention may be used for the preparation of plastics, coatings, films, foils, fibers, and adhesives. For any of these purposes, the polymer may be combined with or prepared in the presence of plasticizers, stabilizers, fillers, pigments, dyes, softeners, natural resins or other synthetic resins.

In event the products are to be used as coating or impregnating agents for porous materials, it is possible to apply the emulsions directly to the material to be coated without the intermediate isolation of the polymer.

As many apparently widely different embodiments of this invention may be made without departing from the spirit and scope thereof, it is to be understood that this invention is not to be limited to the specific embodiments shown and described, except as defined in the following claims.

We claim:

1. A process which consists in polymerizing at temperatures ranging from 20–70° C. the polymerizable components of an aqueous emulsion containing from 5–50% of isobutylene and from 95–50% of acrylonitrile, the aqueous medium of which contains from 0.1 to 2%, based on the weight of the isobutylene, of dissolved ammonium perdisulfate and from .5 to 4%, based on the weight of the aqueous medium used, of sodium cetyl sulfate.

2. A copolymer, the monomeric components of which consist of about 70% acrylonitrile and about 30% of isobutylene.

3. Process which comprises copolymerizing, in aqueous emulsion, a mixture of approximately equal parts of isobutene and of acrylonitrile.

4. A copolymer, the monomeric constituents of which consists of approximately from 10% to 60% of isobutene and correspondingly from 90% to 40% of acrylonitrile.

5. Process which comprises copolymerizing, in aqueous emulsion, a mixture of approximately from 10% to 90% of isobutene, and correspondingly from 90% to 10% of acrylonitrile.

6. Process which comprises copolymerizing, in aqueous emulsion, a mixture of approximately from 30 to 90% of isobutene, and correspondingly from 70% to 10% of acrylonitrile.

7. Process for the production of a copolymer of acrylonitrile and isobutylene which comprises subjecting a monomer mixture consisting of acrylonitrile and an amount of isobutylene greater than the amount of acrylonitrile to copolymerizing conditions in an aqueous medium containing an emulsifying agent and an alkali metal persulfate.

8. The process which comprises polymerizing the polymerizable components of an aqueous emulsion of isobutylene and a vinyl ester selected from the class consisting of acrylonitrile and vinyl acetate, the aqueous medium of which contains a dissolved salt of perdisulfuric acid selected from the group consisting of ammonium and alkali metal salts and a dispersing agent selected from the group consisting of an alkali metal salt of a long chain alkyl sulfate and sulfonate, the alkyl group of which contains from 12 to 18 carbon atoms.

9. The process which comprises polymerizing at temperatures ranging from 0° to 100° C. in a closed vessel containing oxygen-free gas in contact with the reactants, the polymerizable components of an aqueous emulsion containing from 5% to 50% of isobutylene and from 95% to 50% of a vinyl ester selected from the class consisting of acrylonitrile and vinyl acetate, the aqueous medium of said emulsion having a ratio of aqueous to non-aqueous phase of from 10:1 to 1:1 and containing from 0.1% to 10%, based on the weight of the monomer, of a dissolved salt of perdisulfuric acid selected from the group consisting of ammonium and alkali metal salts, and from 0.2% to 5%, based on the weight of the aqueous medium, of a dispersing agent selected from the group consisting of an alkali metal salt of a long chain alkyl sulfate and sulfonate, the alkyl group of which contains from 12 to 18 carbon atoms.

MERLIN M. BRUBAKER.
RALPH A. JACOBSON.

REFERENCES CITED

The following references are of record in the file of this patent:

UNITED STATES PATENTS

| Number | Name | Date |
|---|---|---|
| 2,182,316 | Hopff | Dec. 5, 1939 |
| 2,228,270 | Hopff | Jan. 14, 1941 |
| 2,284,280 | Habgood | May 26, 1942 |
| 2,305,007 | Hopff | Dec. 15, 1942 |
| 2,334,195 | Hopff | Nov. 16, 1943 |
| 2,348,154 | Scott | May 2, 1944 |
| 2,379,292 | Gleason | June 26, 1945 |

FOREIGN PATENTS

| Number | Country | Date |
|---|---|---|
| 513,521 | Great Britain | Oct. 16, 1939 |

OTHER REFERENCES

Mark et al., High Polymers, vol. 3 (1941), (pp. 81–83).